United States Patent Office 2,957,894
Patented Oct. 25, 1960

2,957,894
PROCESS FOR THE PRODUCTION OF 9α-FLUORO-11β-HYDROXY-4-PREGNENES

Albert Wettstein and Georg Anner, Basel, Switzerland, assignors to Ciba Pharmaceutical Products, Inc., Summit, N.J.

No Drawing. Filed May 18, 1955, Ser. No. 509,390

Claims priority, application Switzerland May 25, 1954

1 Claim. (Cl. 260—397.45)

This invention relates to $\Delta^4$-3,20-dioxo-11-hydroxy-9-halogen-17-R-pregnenes, and more particularly to $\Delta^4$-3,20-dioxo-11β-hydroxy-9α-halogeno-17-R-pregnenes and the corresponding 11-oxo compounds, wherein R stands for hydrogen or a lower alkyl radical, for example, methyl. The novel compounds possess cortisone and desoxycorticosterone activity and can be used as medicaments having the action of cortisone and desoxycorticosterone. They can be administered in any suitable dosage form, in the same manner as are cortisone and desoxycorticosterone.

Of special interest are the aforesaid compounds in which the halogeno radical is fluorine or chlorine. Examples of such compounds are: $\Delta^4$-3,20-dioxo-11β-hydroxy-9α-chloro-pregnene, $\Delta^4$-3,20-dioxo-11β-hydroxy-9α-fluoro-pregnene, $\Delta^4$-3,20-dioxo-11β-hydroxy-17α-methyl-9α-chloro-pregnene and $\Delta^4$-3,20-dioxo-11β-hydroxy-17α-methyl-9α-fluoro-pregnene and the corresponding 11-oxo compounds.

The novel compounds in which the halogeno radical is bromine are readily prepared by converting $\Delta^{4,9(11)}$-3,20-dioxo-17-R-pregnadiene, R having the same meaning as hereinbefore assigned thereto, into $\Delta^4$-3,20-dioxo-11β-hydroxy-9α-bromo-17-R-pregnene, for example, by treating the former with N-bromacetamide or N-bromosuccinimide, preferably in the presence of a catalyst, such as sulfuric acid. The resulting $\Delta^4$-3,20-dioxo-11β-hydroxy-9α-bromo-17-R-pregnene can then be converted to the $\Delta^4$-3,20-dioxo-11β-hydroxy-9α-fluoro-17-R-pregnene and $\Delta^4$-3,20-dioxo-11β-hydroxy-9α-chloro-17-R-pregnene in the following manner:

The $\Delta^4$-3,20-dioxo-11β-hydroxy-9α-bromo-17-R-pregnene is treated with a dehydrobrominating agent, that is, an agent which splits off hydrogen bromide, to form $\Delta^4$-3,20-dioxo-9,11β-oxido-17-R-pregnene, which is then treated with hydrogen fluoride to produce the $\Delta^4$-3,20-dioxo-11β-hydroxy-9α-fluoro-17-R-pregnene, or with hydrogen chloride to produce the $\Delta^4$-3,20-dioxo-11β-hydroxy-9α-chloro-17-R-pregnene. When hydrogen iodide is employed there is obtained $\Delta^4$-3,20-dioxo-11β-hydroxy-9α-diodo-17-R-pregnene.

As dehydrobromination agents there can be employed advantageously hydroxides or oxides of metals of the first and second groups of the periodic system, for example, silver oxide, and also tertiary bases, such as pyridine or collidine, or aluminum oxide. It is advantageous to use tertiary bases in combination with one of the aforesaid monovalent or divalent metal hydroxides or oxides. The $\Delta^{4,9(11)}$-3,20-dioxo-17-R-pregnadienes employed as starting materials can be prepared by known methods, for example, by converting $\Delta^4$-3,20-dioxo-11-hydroxy-17-R-pregnenes into the corresponding 11-tosylates and subjecting the latter to the action of sodium acetate in boiling acetic acid.

The $\Delta^4$-3,20-dioxo-11β-hydroxy-9α-halogeno-17-R-pregnenes can be dehydrogenated in known manner to the corresponding 11-oxo compounds, for example by treatment with chromic acid.

The novel compounds can be employed in combination with any suitable carrier to facilitate the administration thereof.

The following examples illustrate the invention:

Example 1

A solution of 110 milligrams of $\Delta^{4,9(11)}$-3,20-dioxo-pregnadiene in 4.5 cc. of tertiary butanol and 1 cc. of water is mixed, while stirring, at about 15° C. with 120 milligrams of N-bromacetamide and 1 cc. of sulfuric acid of 4 percent strength. After a few minutes the reaction solution becomes yellow-brown. For the purpose of decolorization an aqueous 1 percent solution of sodium sulfite and 50 cc. of water are added, the mixture is extracted with a mixture of chloroform and ether (1:3), and the extract is washed several times with ice cold 1 percent sodium carbonate solution and water. By evaporating the chloroform-ether solution in vacuo, there is obtained $\Delta^4$-3,20-dioxo-11β-hydroxy-9α-bromo-pregnene of melting point 145–148° C.

A solution of 110 milligrams of the aforesaid $\Delta^4$-3,20-dioxo-11β-hydroxy-9α-bromo-pregnene in 2 cc. of anhydrous pyridine is agitated with 150 milligrams of freshly precipitated and dried silver oxide for 24 hours in the dark. The silver oxide is filtered off, and the filtrate is evaporated in vacuo. The residue consists of $\Delta^4$-3,20-dioxo-9,11β-oxido-pregnene.

90 milligrams of the above 9,11-oxido-compound are dissolved in 10 cc. of dioxane, then mixed with 2.5 cc. of 2.5 N-hydrochloric acid, and the whole is allowed to stand one hour at room temperature. Water is then added, and the mixture is extracted with a mixture of chloroform and ether (1:3). By washing the extract with water, drying it, and evaporating the solvent in vacuo, there is obtained $\Delta^4$-3,20-dioxo-11β-hydroxy-9α-chloro-pregnene of melting point 203–206° C.

By reacting the $\Delta^4$-3,20-dioxo-9,11β-oxido-pregnene in the same manner with hydrofluoric acid, there is obtained $\Delta^4$-3,20-dioxo-11β-hydroxy-9α-fluoro-pregnene of melting point 213–215° C.

Example 2

100 milligrams of $\Delta^4$-3,20-dioxo-11β-hydroxy-9α-fluoro-pregnene are added to a solution of 100 milligrams of chromic acid in 2 cc. of pyridine. The mixture is stirred for 16 hours at room temperature and then evaporated to dryness. To the residue there is added cold water and ether. After washing the ethereal solution with 5 percent hydrochloric acid and water the solvent is dried and evaporated. The residue after crystallization from ether-petroleum ether yields $\Delta^4$-3,11,20-trioxo-9α-fluoro-pregnene of melting point 171–175° C.

In the same way, $\Delta^4$-3,20-dioxo-11β-hydroxy-9α-chloro-pregnene is converted to $\Delta^4$-3,11,20-trioxo-9α-chloro-pregnene of melting point 211° C.

Example 3

A solution of 110 milligrams of $\Delta^{4,9(11)}$-3,20-dioxo-17α-methyl-pregnadiene in 5 cc. of tertiary butanol and 1 cc. of water is mixed at about 15° C. with 115 milligrams of N-bromacetamide and 1 cc. of sulfuric acid of 4-percent strength. The reaction mixture is worked up as described in Example 1. By evaporating the chloroform ether solution in vacuo, there is obtained $\Delta^4$-3,20-dioxo-11β-hydroxy-17α-methyl-9α-bromo-pregnene.

A solution of 110 milligrams of $\Delta^4$-3,20-dioxo-11β-hydroxy-17α-methyl-9α-bromo-pregnene in 2 cc. of anhydrous pyridine is agitated with 150 milligrams of freshly precipitated and dried silver oxide. By working up as described in Example 1 there is obtained $\Delta^4$-3,20-dioxo-9,11β-oxido-17α-methyl-pregnene. This compound is converted by hydrochloric acid in the same way as indicated in Example 1 into $\Delta^4$-3,20-dioxo-11β-hydroxy- 9α-chloro-17α-methyl-pregnene. Reaction with hydrofluoric acid leads to Δ⁴-3,20-dioxo-11β-hydroxy-9α-fluoro-17α-methyl-pregnene.

Δ⁴,⁹⁽¹¹⁾ - 3,20 - dioxo - 17α - methyl - pregnadiene used as starting material can for example be prepared as follows:

Δ⁴-3,20-dioxo-17α-methyl-pregnene is subjected to the action of the oxygenating enzymes produced by *Rhizopus nigricans*. After working up and fractionation there is obtained Δ⁴-3,20-dioxo-11α-hydroxy-17α-methyl-pregnene. Tosylation followed by treatment of the Δ⁴-3,20-dioxo-11α-tosyloxy-17α-methyl-pregnene with sodium acetate in boiling acidic acid yields Δ⁴,⁹⁽¹¹⁾-3,20-dioxo-17α-methyl-pregnadiene.

What is claimed is:

In the process wherein hydrogen fluoride is reacted with a 9β,11β-oxido-4-pregnene compound to produce the corresponding 9α-fluoro-11β-hydroxy-4-pregnene, the improvement which comprises carrying out the reaction in an aqueous solvent medium.

References Cited in the file of this patent
UNITED STATES PATENTS

| | | |
|---|---|---|
| 2,707,190 | Farrar | Apr. 26, 1955 |
| 2,852,511 | Fried | Sept. 16, 1958 |